(12) United States Patent
Sayeed (10) Patent No.: US 12,496,467 B2
(45) Date of Patent: Dec. 16, 2025

(54) REMOVING ARTEFACTS IN RADIOTHERAPY IMAGING

(71) Applicant: Elekta Limited, Crawley (GB)

(72) Inventor: Abdul Sayeed, Crawley (GB)

(73) Assignee: Elekta Limited, Crawley (GB)

( * ) Notice: Subject to any disclaimer, the term of this patent is extended or adjusted under 35 U.S.C. 154(b) by 379 days.

(21) Appl. No.: 18/166,837

(22) Filed: Feb. 9, 2023

(65) Prior Publication Data

US 2023/0271033 A1 Aug. 31, 2023

(30) Foreign Application Priority Data

Feb. 24, 2022 (GB) .................................. 2202522

(51) Int. Cl.
*A61N 5/10* (2006.01)
*A61B 6/00* (2024.01)

(52) U.S. Cl.
CPC ............ *A61N 5/1078* (2013.01); *A61B 6/482* (2013.01); *A61B 6/5258* (2013.01); *A61N 5/1048* (2013.01); *A61N 2005/1091* (2013.01)

(58) Field of Classification Search
CPC .............. A61N 5/1078; A61N 5/1048; A61N 2005/1091; A61N 5/1075; A61N 2005/1054; A61N 5/1039; A61N 5/1031; A61N 5/1043; A61N 5/1049; A61N 5/1064; A61N 2005/1052; A61N 2005/1055; A61N 2005/1058; A61N 2005/1059; A61N 2005/1061; A61B 6/482; A61B 6/5258; G06T 5/50; G06T 2207/10116; G06T 2207/20216; G06T 2207/30004

See application file for complete search history.

(56) References Cited

U.S. PATENT DOCUMENTS

2021/0370099 A1* 12/2021 Siebers ................ A61N 5/1075

OTHER PUBLICATIONS

"European Application Serial No. 23158299.0, European Search Report dated Jun. 30, 2023", (Jun. 30, 2023), 7 pgs.
Wong, Kelvin, "EPMS 06 conference abstracts ED", Australas. Phys. Eng. Sci. Med. vol. 29, No. 4, (Dec. 1, 2006), 82 pgs.
"British Application No. 2202522.5, Examination Report dated Jun. 19, 2024", (Jun. 19, 2024), 4 pgs.

* cited by examiner

*Primary Examiner* — Courtney D Thomas
(74) *Attorney, Agent, or Firm* — Schwegman Lundberg & Woessner, P.A.

(57) ABSTRACT

A radiotherapy device can include a radiation source configured to deliver kilovolt (KV) or megavolt (MV) radiation and a detector configured to detect the delivered radiation and generate a plurality of images of a subject located between the radiation source and the detector. The radiotherapy device can further include a controller configured to detect an erroneous pixel in an image of the plurality of images and generate an averaged image. Each pixel of the averaged image can be generated by taking an average of two or more respective pixels in two or more corresponding locations of one or more of the plurality of images, and generating a pixel of the averaged image in a corresponding location to the erroneous pixel comprises excluding the erroneous pixel from the taking of the average.

21 Claims, 8 Drawing Sheets

REMOVING ARTEFACTS IN RADIOTHERAPY IMAGING

This disclosure relates to artefacts in radiotherapy imaging, and in particular to removing artefacts in MV/kV images.

CLAIM FOR PRIORITY

This application claims the benefit of priority of British Application Serial No. 2202522.5, filed Feb. 24, 2022, which is hereby incorporated by reference in its entirety.

BACKGROUND

Radiotherapy can be described as the use of ionising radiation, such as X-rays, to treat a human or animal body. Radiotherapy is commonly used to treat tumours within the body of a patient or subject. In such treatments, ionising radiation is used to irradiate, and thus destroy or damage, cells which form part of the tumour.

A radiotherapy device typically comprises a gantry which supports a beam generation system, or other source of radiation, which is rotatable around a patient. For example, for a linear accelerator (linac) device, the beam generation system may comprise a source of radio frequency energy, a source of electrons, an accelerating waveguide, beam shaping apparatus, etc.

In radiotherapy treatment, it is desirable to deliver a prescribed dose of radiation to a target region of a subject and to limit irradiation of other parts of the subject, i.e. of healthy tissue. In view of this, a radiotherapy device may comprise one or more imaging devices for capturing images of the patient before and/or during a radiotherapy treatment, which can be used to make adjustments to machine parameters or patient location. Such image-guided radiation therapy (IGRT) can improve the accuracy of radiotherapy treatments through aiding delivery of an intended dose in an intended location.

Images captured before the radiotherapy treatment begins may provide reference images for the shape and/or location of the patient, and/or may help in positioning the patient in an intended position. Images captured during the radiotherapy treatment may be used to verify that the patient remains in an intended position. Discrete, gross or large-scale movements of a subject may include shifting position, coughing or sneezing. The subject may also undergo cyclical, physiological movement. For example, the subject may undergo respiratory motion due to their breathing cycle. The subject may also undergo cardiac motion based on beating of their heart. In response to determination of such movements using the captured images, the radiotherapy treatment may be halted or adjusted to compensate, for example through gating or tracking of the radiotherapy beam. These techniques may improve clinical outcomes through ensuring that a prescribed dose is delivered to a tumour and that irradiation of healthy tissue such as organs at risk is limited.

A radiotherapy device may comprise components configured to perform MV imaging and may comprise components configured to perform kV imaging. A treatment beam source of a radiotherapy device may emit MV radiation for treating the patient. This treatment beam source may be used as the MV beam source for MV imaging. An MV detector may be disposed diametrically opposite the treatment beam source, with the subject therebetween. A radiotherapy device may comprise a kV imaging source, and a kV detector arranged diametrically opposite to the kV imaging source with the subject therebetween. The kV imaging source and the kV detector may be arranged in a different plane (i.e. at a different angle) to the treatment beam source and the MV detector.

MV or kV image acquisition during radiotherapy treatment (i.e. during MV radiation delivery) results in an artefact in the obtained images. This effect is present when images are read out while MV radiation is being delivered. The MV radiation is delivered in a pulsed manner such that pixels of a detector are affected by the artefact if the reading out of their data overlaps with the delivery of the MV radiation. The effect is seen even when the relevant detector is not in the radiation beam, and is thought to be related to electromagnetic interference. This artefact manifests in 2D captured images as bright or dark lines (depending on inversion of the images), or as rings in reconstructed 3D volumes. This artefact reduces the accuracy of captured images since, due to the artefact, some of the pixels of the image are not accurate or reliable representations of the regions imaged. When decisions to halt or adjust radiotherapy are taken based on such images, this in turn will reduce the accuracy and reliability of the radiotherapy treatment.

One approach for addressing this issue is to use a hardware solution to synchronise when radiation is on and when an image line is read out such that image lines are only read out when radiation is not being delivered. However, this restriction slows down the imaging and requires specific hardware to put it into effect, for example a pulse control circuit, pulse synchronisation circuitry or a detector control board (DCB). In addition, this hardware solution does and will not work for continuous variable dose rate (CVDR) treatments, for which the pulsing rate of the radiation delivery changes continuously.

It would be advantageous to provide more accurate and more reliable imaging during radiotherapy treatments. It would also be advantageous to reduce the need for specialised hardware to provide accurate and reliable imaging during radiotherapy treatment and to provide imaging during radiotherapy treatment that is flexible and adaptable to different radiation delivery approaches. It would also be advantageous to provide more efficient processing of captured images.

SUMMARY

According to an aspect, there is provided a radiotherapy device comprising: a source of kV or MV radiation; a detector configured to detect the kV or MV radiation to generate a plurality of images of a subject located between the source and the detector; and a controller configured to: detect an erroneous pixel in an image of the plurality of images; and generate an averaged image, comprising generating each pixel of the averaged image by taking an average of respective pixels in corresponding locations of one or more of the plurality of images, wherein generating a pixel of the averaged image which is in a corresponding location to the erroneous pixel comprises excluding the erroneous pixel from the taking of the average.

According to a further aspect, there is provided a computer-implemented method comprising: obtaining a plurality of images of a subject located between a source and a detector of a radiotherapy device, the source being a source of kV or MV radiation and the detector being for detecting the kV or MV radiation; detecting an erroneous pixel in an image of the plurality of images; and generating an averaged image, comprising generating each pixel of the averaged image by taking an average of respective pixels in corresponding locations of one or more of the plurality of images, wherein generating a pixel of the averaged image which is in a corresponding location to the erroneous pixel comprises excluding the erroneous pixel from the taking of the average.

According to a further aspect, there is provided a computer-readable medium comprising computer-executable instructions which, when executed by a processor, cause the processor to perform the above-described method.

BRIEF DESCRIPTION OF THE DRAWINGS

Specific embodiments are now described, by way of example only, with reference to the drawings, in which.

DETAILED DESCRIPTION

MV and/or kV imaging during delivery of radiotherapy results in an artefact in the acquired images, which appears as a set of lines across the acquired images. The current disclosure provides techniques for removing this artefact in order to improve the accuracy and reliability of the images obtained. In particular, the current techniques use a software solution to mask out the artefacts from the images by applying temporal or spatial averaging to selected pixels of the output image data. The lines can be detected in the acquired images, for example by summing along the axis of the lines. When temporally or spatially averaging the pixels of the images in order to generate an averaged image, instead of averaging all pixels, the pixels corresponding to the line artefacts are excluded from the averaging. In other words, each averaged pixel value in an averaged image will be an average over the pixels from fewer frames (temporal), and/or will be an average over fewer pixels of a single frame (spatial), due to masking out the pixels corresponding to the artefact. This improves the accuracy of the averaged image in a fast, computationally efficient manner, while also reducing the need for specialised hardware and increasing versatility through enabling application to additional modes of radiotherapy treatment.

FIGS. 1a-e depict an example of a medical device 100 according to the present disclosure. The medical device 100 may be a radiotherapy device or an imaging device. The medical device 100 may be a radiotherapy device comprising an imaging apparatus.

Figure 1A:
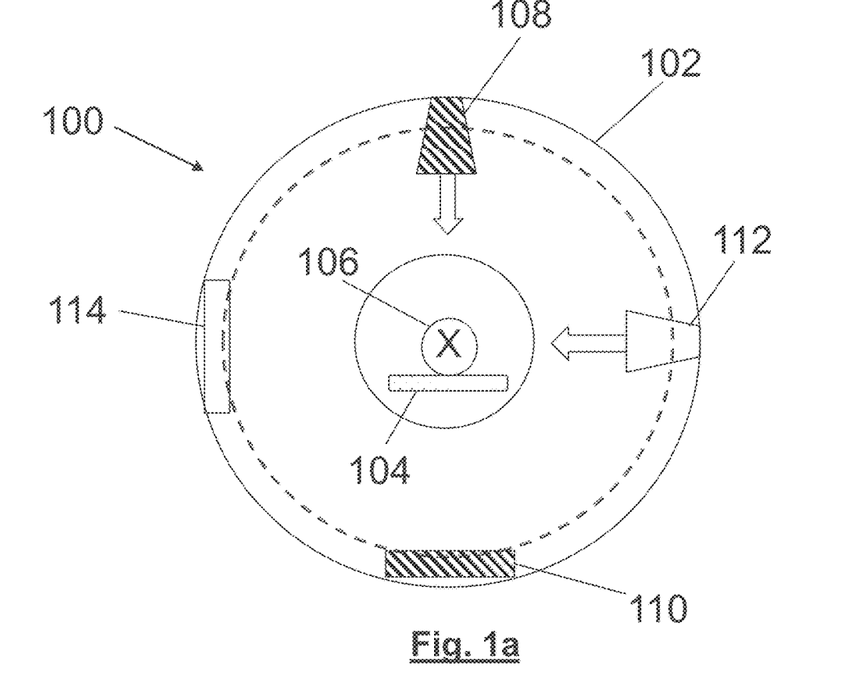
FIGS. 1a-1e depict a radiotherapy device or apparatus according to the present disclosure.

The radiotherapy device 100 depicted in FIG. 1a comprises a rotatable gantry 102 and a couch 104 positioned in a treatment volume of the device. The gantry 102 may be ring-shaped. In other words, the gantry 102 may be a ring-gantry. A patient or subject 106 is positioned on the couch 104 during radiotherapy treatment. The radiotherapy device 100 may comprise a bore defined by the ring-shaped gantry 102, within which the subject 106 is positioned during treatment. Alternatively, the radiotherapy device may comprise one or more arms connected to and projecting from the front surface of the gantry 102, the arm(s) supporting one or more components of the radiotherapy device 100. The couch 104 may be moveable in one or more translational degrees of freedom and one or more rotational degrees of freedom. The couch 104 may be used to move the subject 106 from a setup position to a treatment position closer to or encircled by the gantry 102, for example by translating the subject 106 in a direction parallel to the central axis of the gantry 102. The movement of the couch 104 may be effected and controlled by one or more actuators and/or motors.

The radiotherapy device 100 comprises one or more sources of kV or MV radiation and one or more detectors configured to detect the kV or MV radiation to generate a plurality of images of a subject between the source and the detector. In particular, the radiotherapy device 100 may comprise a treatment beam source 108 configured to emit or direct therapeutic radiation, e.g. MV energy radiation, towards the subject 106. The treatment beam source 108 may be described as an MV beam source. The treatment beam source 108 may emit radiation suitable for treating a subject 106 and may emit radiation suitable for generating one or more images of the subject 106.

The radiotherapy device 100 may comprise a source of radiofrequency waves, an electron source, a waveguide in which the electrons may be accelerated towards a heavy metal, e.g. tungsten, target to produce high energy photons, and a collimator, such as a multi-leaf collimator, configured to collimate and shape the resulting photons and thus produce a treatment beam. The source of radiofrequency waves may be coupled to the waveguide via a circulator, and may be configured to pulse radiofrequency waves into the waveguide. Radiofrequency waves may pass from the source of radiofrequency waves through an RF input window and into an RF input connecting pipe or tube. The source of electrons, such as an electron gun, may also be coupled to the waveguide and may be configured to inject electrons into the waveguide. In the electron gun, electrons may be thermionically emitted from a cathode filament as the filament is heated. The temperature of the filament controls the number of electrons injected. The injection of electrons into the waveguide may be synchronised with the pumping of the radiofrequency waves into the waveguide. The design and operation of the source of radiofrequency waves, electron source and the waveguide may be such that the radiofrequency waves accelerate the electrons to very high energies as the electrons propagate through the waveguide.

The design of the waveguide depends on whether the linac accelerates the electrons using a standing wave or travelling wave, though the waveguide typically comprises a series of cells or cavities, each cavity connected by a hole or 'iris' through which the electron beam may pass. The cavities are coupled in order that a suitable electric field pattern is produced which accelerates electrons propagating through the waveguide. As the electrons are accelerated in the waveguide, the electron beam path may be controlled by a suitable arrangement of steering magnets, or steering coils, which surround the waveguide. The arrangement of steering magnets may comprise, for example, two sets of quadrupole magnets.

Once the electrons have been accelerated, they may pass into a flight tube. The flight tube may be connected to the waveguide by a connecting tube. This connecting tube or connecting structure may be called a drift tube. The electrons travel toward a heavy metal target which may comprise, for example, tungsten. Whilst the electrons travel through the flight tube, an arrangement of focusing magnets act to direct and focus the beam on the target.

To ensure that propagation of the electrons is not impeded as the electron beam travels toward the target, the waveguide may be evacuated using a vacuum system comprising a vacuum pump or an arrangement of vacuum pumps. The pump system is capable of producing ultra-high vacuum (UHV) conditions in the waveguide and in the flight tube. The vacuum system also ensures UHV conditions in the electron gun. Electrons can be accelerated to speeds approaching the speed of light in the evacuated waveguide.

The treatment beam source 108 may comprise a heavy metal target toward which the high energy electrons exiting the waveguide are directed. When the electrons strike the target, X-rays are produced in a variety of directions. A primary collimator may block X-rays travelling in certain directions and pass only forward travelling X-rays to produce a treatment beam. The X-rays may be filtered and may pass through one or more ion chambers for dose measuring. The beam can be shaped in various ways by beam-shaping apparatus, for example by using a multi-leaf collimator, before it passes into the patient as part of radiotherapy treatment.

In some implementations, the treatment beam source 108 is configured to emit either an X-ray beam or an electron particle beam. Such implementations allow the device to provide electron beam therapy, i.e. a type of external beam therapy where electrons, rather than X-rays, are directed toward the target region. It is possible to 'swap' between a first mode in which X-rays are emitted and a second mode in which electrons are emitted by adjusting the components of the linac. In essence, it is possible to swap between the first and second mode by moving the heavy metal target in or out of the electron beam path and replacing it with a so-called 'electron window'. The electron window is substantially transparent to electrons and allows electrons to exit the flight tube.

The radiotherapy device 100 may comprise a treatment beam detector or target 110. The treatment beam detector 110 may be described as an MV detector. Once the radiation emitted from the treatment beam source 108 has passed through the patient 106, the radiation continues towards treatment beam detector 110, where it is blocked/absorbed. The treatment beam detector 110 may comprise or include an imaging panel. The treatment beam detector 110 may be configured to produce signals indicative of the intensity of radiation incident on the treatment beam detector 110. In use, these signals are indicative of the intensity of radiation which has passed through the subject 106. These signals may be processed to form an image of the subject 106. This process may be described as the imaging apparatus and/or the treatment beam detector 110 capturing an image. The treatment beam detector 110 may form part of an electronic portal imaging device (EPID). EPIDs are generally known to the skilled person and will not be discussed in detail herein. The treatment beam source 108 and the treatment beam detector 110 may be fixed or attached to the gantry so that they are rotatable with the gantry, i.e. so that they rotate as the gantry rotates.

The radiotherapy device 100 may comprise a kV beam source 112 and a kV detector or target 114. The kV beam source 112 is configured to emit or direct imaging radiation, for example X-rays, towards the subject 106. As the skilled person will appreciate, the kV beam source 112 may be an X-ray tube or other suitable source of X-rays. The kV beam source 112 is configured to produce kV energy radiation. Once the kV radiation has passed from the kV beam source 112 and through the subject 106, the radiation continues towards kV detector 114. The kV detector 114 may comprise or include an imaging panel. The kV detector 114 may be configured to produce signals indicative of the intensity of radiation incident on the kV detector 114. In use, these signals are indicative of the intensity of radiation which has passed through the subject 106. These signals may be processed to form an image of the subject 106. This process may be described as the imaging apparatus and/or the kV detector 114 capturing an image. The kV beam source 112 and the kV detector 114 may be fixed or attached to the gantry so that they are rotatable with the gantry, i.e. so that they rotate as the gantry rotates. By taking images at multiple angles around the subject 106 it is possible to produce a 3D image of the patient, for example using tomographic reconstruction techniques.

In the illustrated example, the treatment beam source 108 and the kV beam source 112 are mounted on the gantry such that a treatment beam emitted from the treatment beam source 108 travels in a direction that is generally perpendicular to that of the imaging beam emitted from the kV beam source 112. Pulsing of radiation from the treatment beam source 108 may be synchronised with reading out of data at the treatment beam detector 110. Pulsing of radiation from the kV beam source 112 may be synchronised with reading out of data at the kV detector 114. Timing signals may be communicated from a controller of the radiotherapy device to one or more of these components in order to provide this synchronisation.

The treatment beam detector 110 and/or the kV detector 114 may comprise a flat panel imager. The flat panel imager of the kV detector 114 may be different to the flat panel imager of the treatment beam detector 110 since it is attuned to the different (i.e. lower) energies of the kV radiation. At kV energies, the attenuation coefficients of different tissue types are distinctly different such that a good image with adequate contrast can be obtained. At MV energies, the attenuation coefficients are more similar such that the contrast of the generated images is typically lower. Thus, it may be particularly important to maximise the quality of generated MV images and to avoid the presence of artefacts in these images which could obscure the anatomy of the subject 106.

The flat panel imager may comprise a scintillator. Radiation incident on the scintillator will produce light. The flat panel imager may comprise an array of photodiodes and transistors, each corresponding to a particular pixel of the detector/flat panel imager. The light from the scintillator impinging on the photodiodes creates respective electronic signals which are gated by the respective transistors. These electronic signals are extracted from the flat panel array via read-out electronics to form a digital data stream that is used to construct an image. Generally, the pixel elements of such detectors work by outputting a respective signal in which the total charge passed reflects the total incident radiation since the last time the pixel was read. As radiation is incident on the pixel, it causes ionisation and the resulting charge is retained. When the pixel is enabled, i.e. when it is triggered to release its signal, that charge is output to be counted. The flat panel imager may comprise an interpreter configured to receive the signal outputs. The interpreter may comprise an integrator configured to integrate the signal outputs to measure the charges collected at the respective pixels and thus provide an indication of the radiation received by the pixels of the flat panel imager. This can be used to identify the shape and location of objects (e.g. the subject) between the source and detector through the relative lack of radiation received at the pixels for which the radiation from the source was blocked by the object.

The pixels of the detector may be arranged in a rectilinear manner with the pixels in straight rows and columns. The intersection of a particular row with a particular column therefore defines a specific pixel. Each column may have a common output line which allows the charge that has accumulated on each pixel to escape to the integrator where it is multiplexed with the outputs of other columns. This may enable the entire line of pixels to be read out at the same time. The detector may comprise scanning control electronics which enable each row to be read sequentially, with the whole row read at substantially the same time. The integrator is then reset, and the next row is enabled. Thus, data from the rows of pixels may be read out sequentially until a complete image or frame is obtained, following which the reading out may begin again at the first row.

Figure 1B:
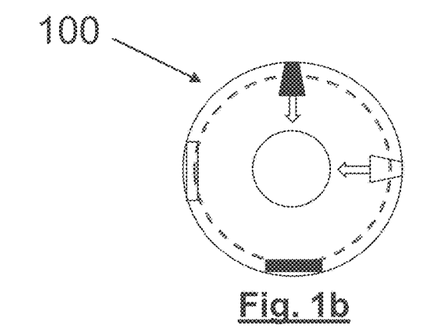
Figure 1C:
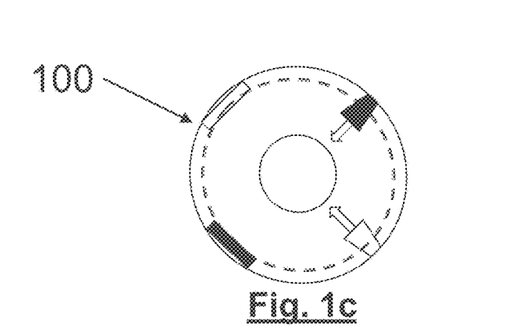
Figure 1D:
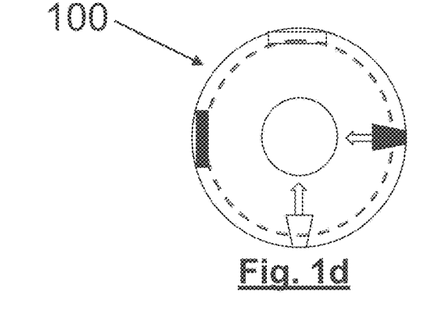
Figure 1E:
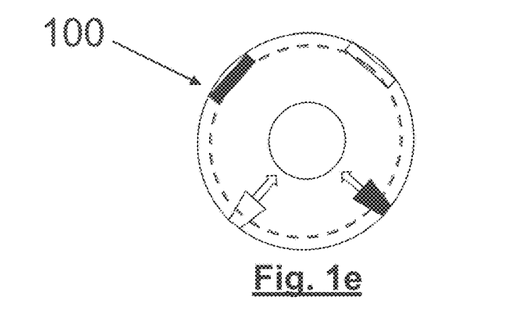

FIGS. 1b-1e depict the gantry 102 of FIG. 1a at different rotation angles. Because the gantry 102 is rotatable, the treatment beam can be delivered to a patient from a range of angles. Similarly, the patient can be imaged from a range of angles. In FIG. 1b, the gantry is positioned at a 'first' gantry rotation angle, in which the treatment beam source 108 directs the treatment beam towards the subject 106 in a vertical/downwards direction and in which the kV beam source 112 directs the imaging beam towards the patient in a horizontal/right-to-left direction. In FIG. 1c, the gantry 102 has been rotated 45-degrees clockwise, into a 'second' rotation angle. In FIG. 1d, the gantry has been rotated a further 45-degrees clockwise (i.e. 90-degrees clockwise relative to FIG. 1b) into a 'third' rotation angle, so that the treatment beam source 108 directs the treatment beam towards the subject 106 in a horizontal/right-to-left direction and in which the kV beam source 112 directs the imaging beam towards the subject 106 in a vertical/upwards direction. Finally, in FIG. 1e, the gantry has been rotated a further 45-degrees clockwise (i.e. 135-degrees clockwise relative to FIG. 1b) into a 'fourth' rotation angle.

As the skilled person will appreciate, the gantry 102 can be rotated to any of a number of angular positions relative to a patient. The treatment beam source 108 may direct radiation toward the patient at each or a number of these angular positions, according to a treatment plan. The gantry 102 may be configured to rotate to a number of discrete locations and/or to rotate continuously for a given time period. In other words, the gantry 102 can be rotated by 360 degrees around the subject 106, and in fact can continue to be rotated past 360 degrees. The treatment beam source 108 may be configured to irradiate the subject 106 at the one or more of the discrete locations and/or to continuously irradiate the subject 106 as it is rotated by the gantry 102. The angles from which radiation is applied, and the intensity and shape of the therapeutic beam, may depend on a specific treatment plan pertaining to a given subject 106.

The radiotherapy device 100 additionally comprises a controller (not shown). The controller is a computer, processor, or other processing apparatus. The controller may be formed by several discrete processors; for example, the controller may comprise a processor for each of the various individual components of the radiotherapy device as described herein. The controller is communicatively coupled to a memory, e.g. a computer readable medium. The controller may be communicatively coupled to one, multiple or all of the various individual components of the radiotherapy device as described herein. As used herein, the controller may also be referred to as a control device.

The radiotherapy device and/or the controller may be configured to perform any of the method steps presently disclosed and may comprise computer executable instructions which, when executed by a processor cause the processor to perform any of the method steps presently disclosed, or when executed by the controller cause the controller to perform any of the method steps presently disclosed, or when executed by the radiotherapy device cause the radiotherapy device to perform any of the method steps presently disclosed. Any of the steps that the radiotherapy device and/or the controller is configured to perform may be considered as method steps of the present disclosure and may be embodied in computer executable instructions for execution by a processor. A computer-readable medium may comprise the above-described computer executable instructions.

The controller may be communicatively coupled to and may be configured to send control signals to multiple different components of the radiotherapy device 100, for example those described above and elsewhere herein. The controller may be configured to send control signals to one or more components of the radiotherapy device 100 in order to effect changes in radiotherapy treatment and/or imaging of the subject 106. The controller may also collect data indicative of the performance and actions of various components of the device 100.

The radiotherapy device 100 may be described as or comprise a linac. In some examples, the radiotherapy device 100 may be an MR-linac comprising an MR imaging apparatus configured to generate MR images of the subject 106. The MR imaging apparatus may be configured to obtain images of the subject 106 positioned, i.e. located, on the couch 104. The MR imaging apparatus may also be referred to as an MR imager. The MR imaging apparatus may be a conventional MR imaging apparatus operating in a known manner to obtain MR data, for example MR images. The skilled person will appreciate that such a MR imaging apparatus may comprise a primary magnet, one or more gradient coils, one or more receive coils, and an RF pulse applicator. The operation of the MR imaging apparatus is controlled by the controller. Alternatively or in addition to MR imaging, one or more other imaging techniques, modalities, sensors or detectors may be used, such as CT/X-ray, PET, optical imaging/cameras, infra-red imaging, ultrasound imaging or time-of-flight techniques. Any one or more of these may be used before or during treatment of a subject 106.

The radiotherapy device 100 also comprises several other components and systems as will be understood by the skilled person. For example, in order to ensure the linac does not leak radiation, appropriate shielding may also be provided.

The present disclosure describes techniques for increasing the accuracy of imaging by removing an artefact from generated images. The images may be generated using MV imaging, i.e. using the treatment beam source 108 and the treatment beam detector 110, and/or may be generated using kV imaging, i.e. using the kV beam source 112 and the kV detector 114.

Figure 2:
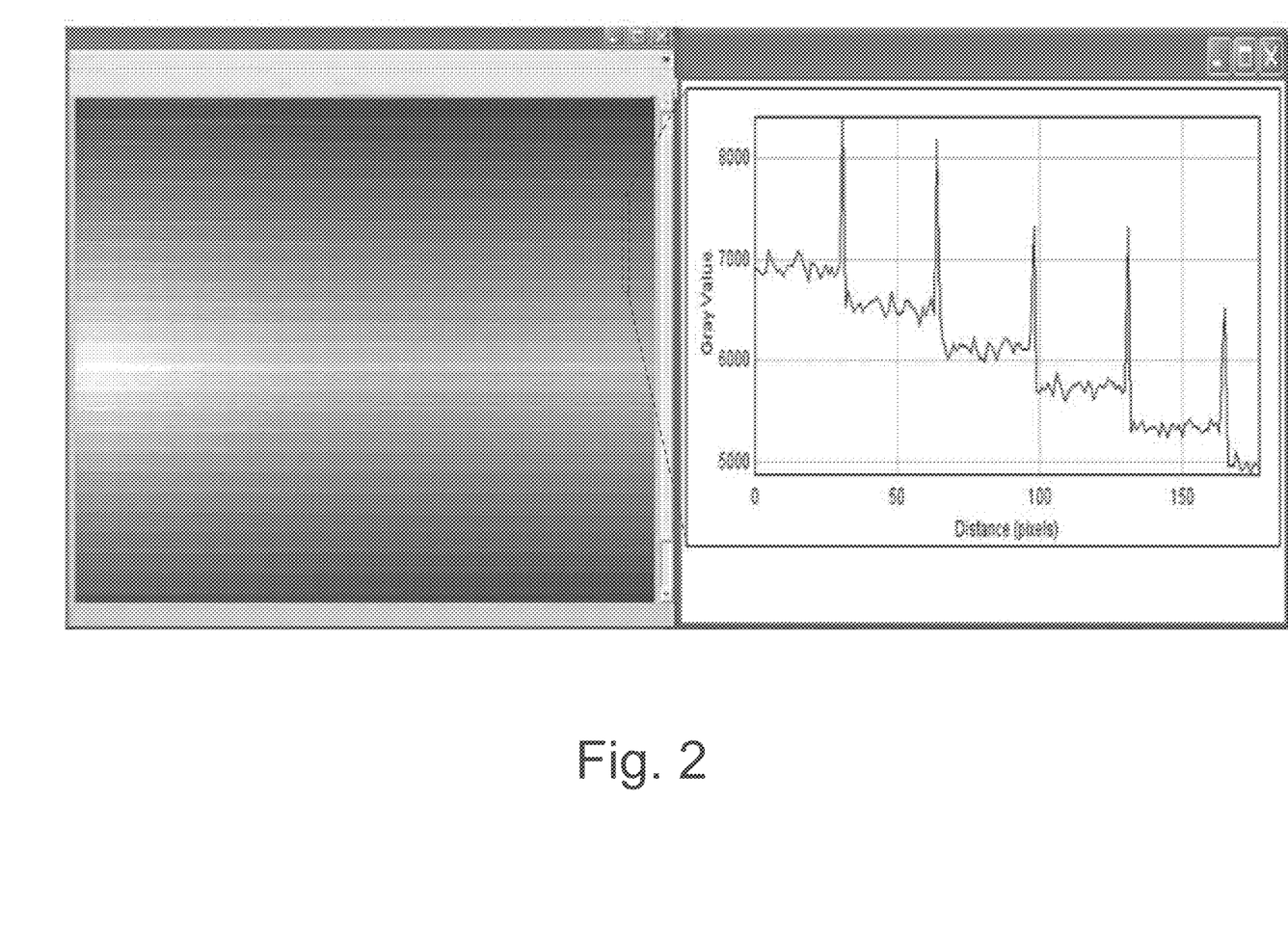
FIG. 2 depicts an artefact in images generated using kV imaging according to the present disclosure.

FIG. 2 depicts an artefact in images generated using kV imaging. The artefact manifests in a similar manner in images generated using MV imaging. The left side of FIG. 2 depicts a kV image generated with nothing in the field of view, i.e. with no subject 106 between the kV beam source 112 and the kV detector 114. If a kV image is generated while radiation is being applied, i.e. while treatment beam source 108 is emitting radiation suitable for treating the subject 106, the artefact is induced on the line of the kV image which is being read out at the time. This is visible on the left side of FIG. 2 as a series of horizontal lines which are lighter in colour than the rest of the kV image. These lines are described as artefacts because they are not representative of any object between the kV beam source 112 and the kV detector 114, i.e. they correspond to erroneous or invalid or inaccurate data points or pixels. On the right side of FIG. 2, there is depicted a profile taken along a portion of the vertical axis of the kV image shown on the left of FIG. 2. The dashed lines indicate the subset of the kV image based on which the profile has been generated. The series of spikes correspond to the artefacts, i.e. to the lighter horizontal lines shown on the left side of FIG. 2.

Figure 3:
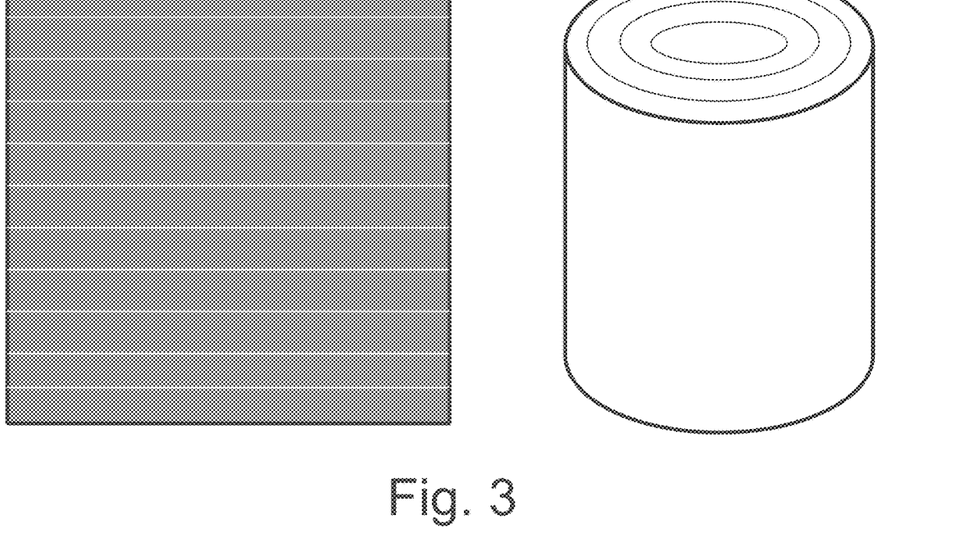
FIG. 3 depicts a schematic view of the artefact according to the present disclosure.

FIG. 3 depicts a schematic view of the artefact. While the kV image and profile shown in FIG. 2 may correspond to actual measured data, FIG. 3 depicts an idealised view for each of explanation. Again, for this idealised view, no subject 106 is present between the kV beam source 112 and the kV detector 114. On the left side of FIG. 3, a kV image is depicted, with the artefact visible as white horizontal lines. These may be referred to as pulse lines. The kV image may be referred to as a projection image. On the right side of FIG. 3, a reconstructed volume is shown, i.e. a volume generated using kV imaging. Once reconstruction is applied, the artefact manifests as a series of concentric rings (shown in black on the right side of FIG. 3). In this form, the artefact may further exacerbate degradation of image quality as the concentric rings may be more difficult to exclude or work around.

The techniques described herein provide improved means for increasing image quality through improved negation of the effects of imaging artefacts. This can improve the accuracy of the generated images and therefore can improve the accuracy and clinical outcomes of a radiotherapy treatment.

Figure 4:
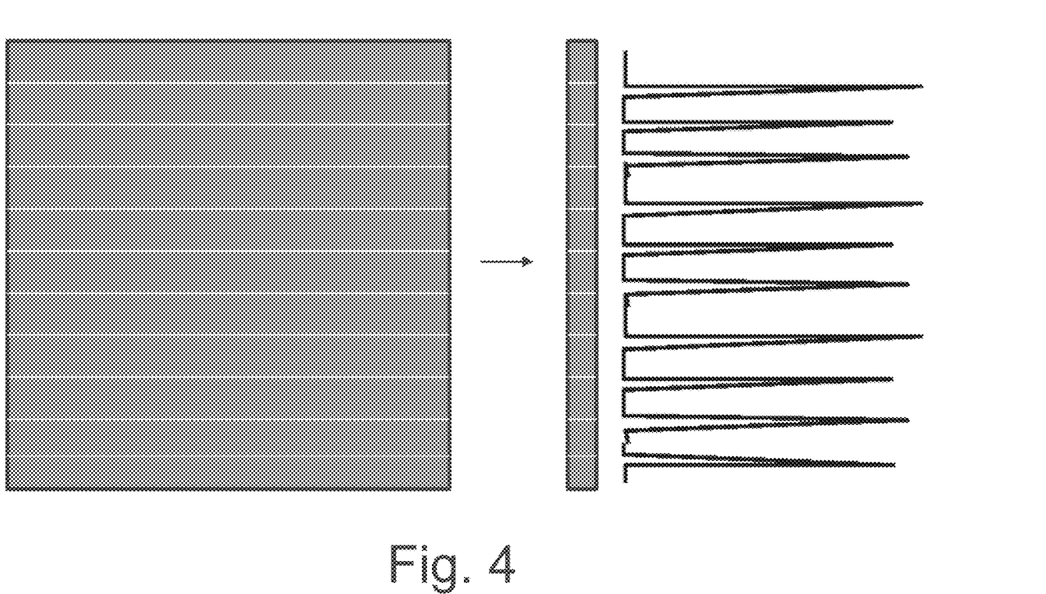
FIG. 4 depicts a technique for identification of the artefact according to the present disclosure.

FIG. 4 depicts a technique for identification of the artefact, i.e. of the pulse lines. The image on the left side of FIG. 4 corresponds to the image on left side of FIG. 3, with the artefact shown as a series of white horizontal lines. This image may be summed along the horizontal axis, i.e. along the axis of the artefact. This is depicted diagrammatically in the centre right FIG. 4 as the shortening of the image in a horizontal direction. The profile shown in black on the right of FIG. 4 depicts the pixel values of the image summed along the horizontal axis. In other words, each point of the profile may have a value that corresponds to the sum of the pixel values along the row corresponding to that point. The profile is shown in black for visibility/ease of understanding (while the artefact is shown in white) and it will be understood by the skilled person that the profile may therefore correspond to a negative (i.e. multiplication by −1) of the summed pixel values.

The artefact may be said to be detected by detecting the lines in the image, or to be detected based on the summed image, or to be detected based on the profile. In other words, the pixels affected by the artefact may be identified by their vertical coordinates, i.e. by their coordinates along an axis perpendicular to the axis of the artefact. Since the artefacts correspond to horizontal lines, it may be determined that all of the pixels in the horizontal lines corresponding to the identified vertical coordinates may be affected by the artefact. The artefact may be detected as corresponding to the peaks in the profile. For example, the artefact may be determined to be present in the pixels for which the profile exceeds a threshold. The threshold may be set based on an average of all pixel values of the image as a whole or based on a predetermined value. The artefact may be determined to be present in the pixels corresponding to points of the profile that exceed an average of the profile by a predetermined absolute value or that exceed an average of the profile multiplied by a predetermined multiplying factor. In examples in which individual erroneous pixels, rather than rows of erroneous pixels, are detected, the individual erroneous pixels may be identified as those that exceed a threshold or that exceed an average of the pixel values of the relevant image by a predetermined absolute value or that exceed an average of the profile multiplied by a predetermined multiplying factor.

One or more additional or alternative techniques may be used to detect the artefact. For example, a more complex line detection algorithm such as Hough transforms may be used, or artificial intelligence/machine learning techniques/computer vision may be used. However, the technique described above using summing of the image is advantageous in that the algorithm may be executed in a particularly fast and computationally efficient manner and may be implemented very close to the device layer. It may therefore reduce the need for extensive processing power or other additional hardware and improve the speed of the imaging.

A kV or MV imaging apparatus as described herein may generate images with a certain temporal frame rate and with a certain spatial resolution. This frame rate and resolution may be higher than is necessary for monitoring a subject 106. For example, the finite MV spot size of the treatment beam source 108 may be such that the nominal spatial resolution exceeds the image quality that is actually deliverable. Therefore, known techniques comprise temporally averaging a plurality of frames and/or spatially averaging a plurality of pixels of one frame (i.e. a spatial grouping of pixels). Processing images by temporally averaging a plurality of frames will reduce the frame rate of the processed images.

Processing images by spatially averaging pixels of respective frames will reduce the spatial resolution of the processed images. However, the processed images may be more accurate and/or less noisy than the raw, unprocessed images. Either or both of temporal averaging and spatial averaging may be applied, depending on the frame rate and spatial resolution of the raw images and the desired frame rate and spatial resolution of the processed images. In some examples, temporal averaging may be applied first, following which spatial averaging may be applied to the temporally averaged images. In some examples, spatial averaging may be applied first, following which temporal averaging may be applied to the spatially averaged images.

Due to the temporal and/or spatial averaging described above, the effect of the artefact described herein will be diluted, i.e. the erroneous pixels (also described as invalid pixels or inaccurate pixels) will be averaged with other, non-erroneous pixels such that a value associated with an averaged pixel is 'less erroneous' than the erroneous pixel itself. However, it will still not be an accurate representation of what lies between the radiation source and the detector. The artefact will manifest as a systematic error in the captured image. Techniques of the present disclosure enable a further increase in the accuracy of kV and/or MV images.

Figure 5:
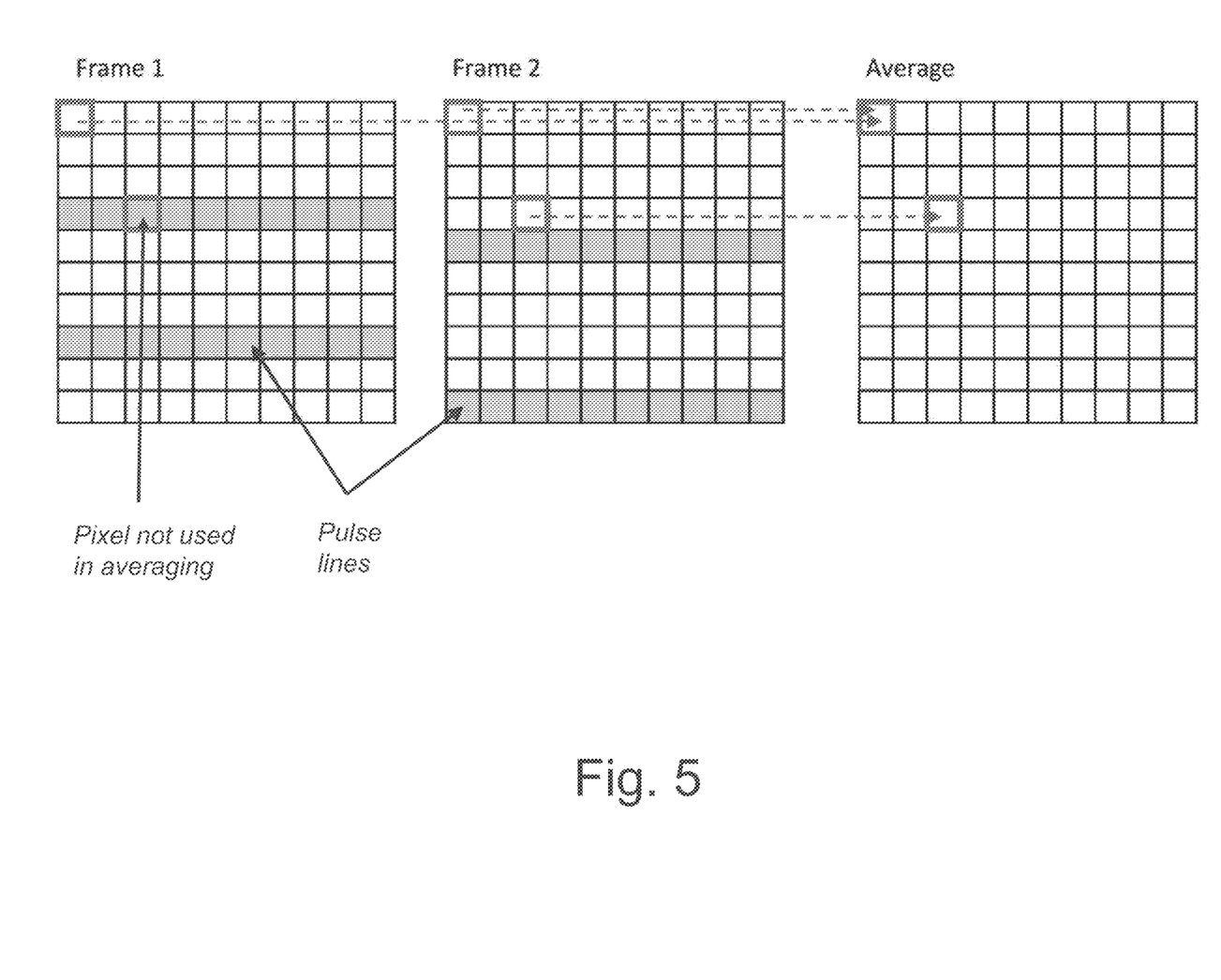
FIG. 5 depicts a temporal averaging process according to the present disclosure.

FIG. 5 depicts a temporal averaging process according to the present disclosure. In FIG. 5, two images or frames ('Frame 1' and 'Frame 2') are shown as being averaged for ease of explanation. However, it will be appreciated that the temporal averaging process described herein is applicable to three, four, five, six, seven, eight, nine, ten, or any number of frames, dependent on the frame rate of the raw data and the frame rate of the processed images that is desired. In an example, the frame rate of the imaging may be fifteen frames per second, and five successive images may be averaged to provide images at three frames per second. The second image ('Frame 2') may be captured at a later time to the first image ('Frame 1'). The second image may be the next captured image following the capturing of the first image.

Each of the first and second images are depicted as comprising a ten by ten spatial grid of pixels for ease of explanation. As will be appreciated, the described techniques are applicable to images comprising any number of pixels, including to non-square grids of pixels. The pixels affected by the artefact are shown as shaded in FIG. 5. These pixels comprise or are associated with erroneous data. These pixels may correspond to the lines identified in the process described in relation to FIG. 4. The pulse lines may be in different spatial locations in the second image to the spatial locations of the pulse lines in the first image. This may be due to the pulsing of the treatment beam occurring at different times in the reading out of the rows of the second image relative to the reading out of the rows of the first image. As such, different rows may be affected by the artefact in different images such that non-erroneous data for a particular pixel may typically be obtained from at least some of the captured images which are temporally averaged together.

An averaged image may be generated based on the plurality of images, i.e. based on the first image and the second image in this example. As used herein, references to taking an average may be used to refer to taking of a mean. As used herein, references to averaging pixels may be used to refer to taking an average of the values associated with each of the pixels. The averaged image may have the same dimensions as the first image and the second image (as shown in FIG. 5). In other examples, the averaged image may have different dimensions to the first image and the second image, for example if the first and second images are also spatially averaged and/or if the first and second images are cropped. A pixel location in the averaged image may correspond to a pixel location in the first image and to a pixel location in the second image. In other words, the pixel value at a particular (x, y) coordinate in the averaged image may be determined by taking the average of pixel values at the same, i.e. corresponding, (x, y) coordinates in one or more of the plurality of images.

The controller may determine, pixel-by-pixel, the value of each pixel of the averaged image. For each pixel of the averaged image, it may be determined whether the pixels in corresponding locations (i.e. at corresponding coordinates) of each of the plurality of images correspond to erroneous data, i.e. whether they have been identified as corresponding to erroneous data according to the techniques described in relation to FIG. 4. For each pixel of the averaged image, an average is taken over each of the pixels in the corresponding locations of the plurality of images which do not correspond to erroneous data. In other words, the mean is taken of all pixels in corresponding locations in the plurality of images which do not correspond to erroneous data. Any pixel in a corresponding location which is associated with erroneous data, i.e. with the artefact, may be masked out of the taking of the average, i.e. its data may not be included in the taking of the average.

For example, starting at the top left corner of FIG. 5, the pixel in the top left corner of the averaged image may be determined to have a value corresponding to the average of the values associated with each of the pixels in the respective top left corners of the first image and the second image. Neither the pixel in the top left corner of the first image nor the pixel in the top left corner of the second image comprises erroneous data. Therefore, the value associated with the top left pixel of the averaged image is the average of the value of the pixel in the top left corner of the first image and the value of the pixel in the top left corner of the second image. No erroneous data associated with the artefact is present in relation to this pixel and therefore no masking of values is performed.

The averaging may proceed pixel-by-pixel, for example along each row in turn or down each column in turn. In some examples, the averaging of the different pixels may be performed in parallel by different processors in order to speed up the processing. The described techniques may be particularly suited to such parallel processing due to the ability to consider each pixel of an image in isolation relative to those surrounding it. There is no decay constant between the lines of the artefact such that only particular lines of a captured image are affected, without the effects spreading into neighbouring lines. Even if such spreading were to occur, the described techniques would continue to work by detecting all affected lines, i.e. all lines affected above a threshold.

An example of the taking of an average which does require masking is also depicted in FIG. 5, namely for the pixel in the fourth row and the third column of each of the first image, the second image and the averaged image. For this pixel, the value for the first image has been identified as being erroneous due to the artefact. Therefore, the controller masks this value from the taking of the average. In this example, the average is therefore the average of the pixel of the second image alone, i.e. the 'average' value corresponds to the value of the second image.

As will be appreciated, for averages over a greater number of images, the value of a given pixel in the averaged image may be an average over the corresponding pixels of a greater number of images. For example, the temporal average may be over five frames. It may be determined by the controller that the corresponding pixels in four of the five frames are non-erroneous and therefore the value of the pixel in the averaged image may be calculated by taking the average of the four non-erroneous values. Alternatively, it may be determined by the controller that the corresponding pixels in one, two or three of the five frames are non-erroneous and therefore the value of the pixel in the averaged image may be calculated by taking the average of the one, two or three non-erroneous values respectively.

Figure 6:
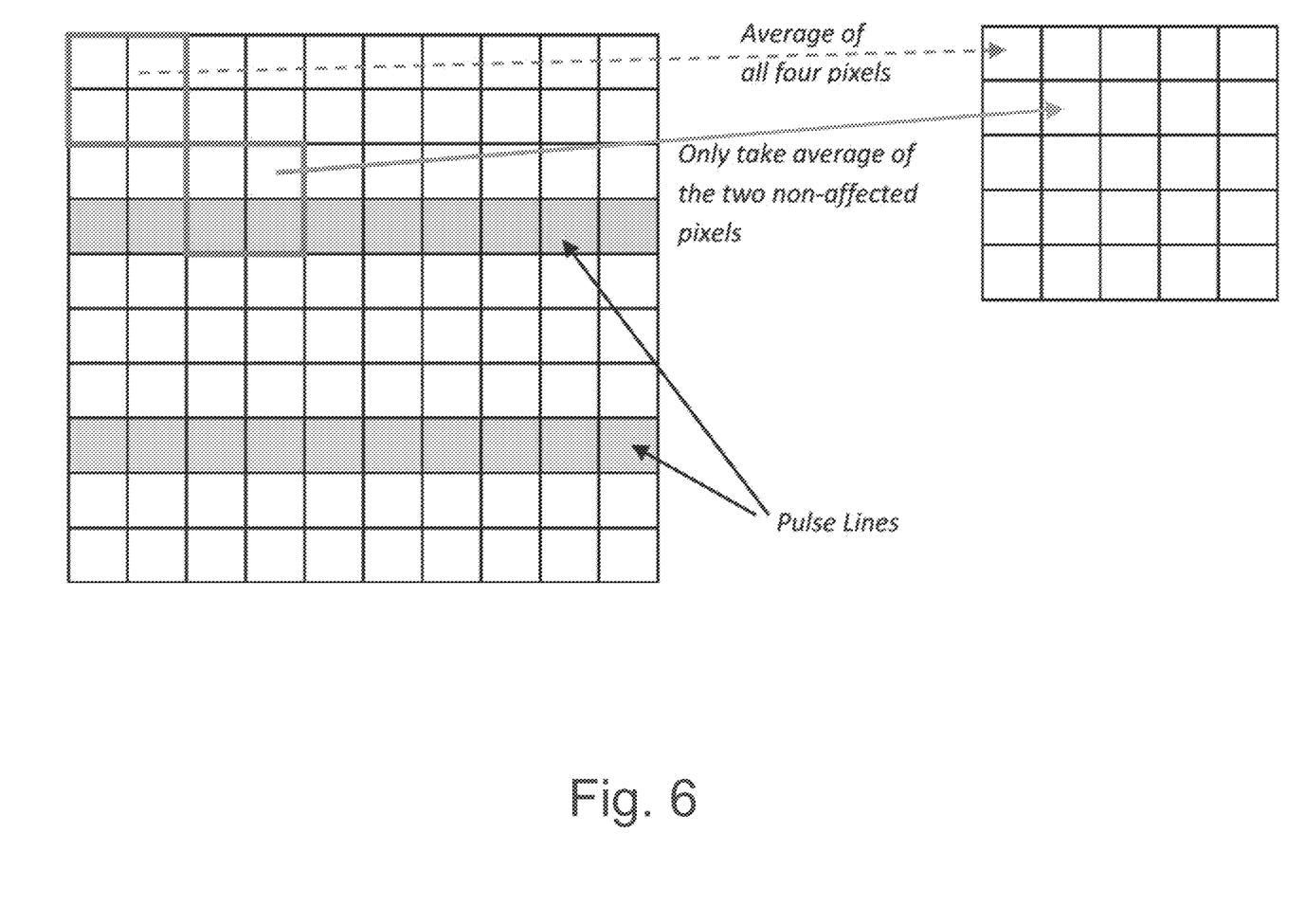
FIG. 6 depicts a spatial averaging process according to the present disclosure.

FIG. 6 depicts a spatial averaging process according to the present disclosure. In FIG. 6, a single frame or image is depicted on the left of the figure as comprising a ten by ten spatial grid of pixels. As will be appreciated, the described techniques are applicable to images comprising any number of pixels, including to non-square grids of pixels. The pixels affected by the artefact are shown as shaded in FIG. 6. These pixels comprise or are associated with erroneous data. These pixels may correspond to the lines identified in the process described in relation to FIG. 4.

An averaged image, i.e. a spatially averaged image, may be generated based on the image. In other words, the averaged image may comprise a smaller number of pixels than the image, with each pixel of the averaged image being generated based on multiple pixels of the image. In FIG. 5, for ease of explanation, the averaged image is depicted as comprising a 5 by 5 grid of pixels and the spatial average is such that each pixel in the averaged image is generated based on taking the average of a two by two sub-grid of pixels of the image in a corresponding location. In other words, each pixel in the averaged image may be generated by taking the average of four pixels of the image. The sub-grid of pixels in the image and the pixel of the averaged image generated from this sub-grid of pixels may be described as being in corresponding locations. Each of the pixels in the sub-grid in the image and the pixel of the averaged image generated from this sub-grid may be described as being in corresponding locations. In the context of the field of view imaged, these pixels capture corresponding spatial information.

In other examples, the sub-grid may be a three by three, four by four, five by five sub-grid, or any other suitable sub-grid dependent on the resolution of the generated image and the desired resolution of the averaged image. For example, the raw images may be captured with a resolution of 1024×1024 or 2048×2048 pixels, and may be downsized to a resolution of 512×512 pixels (i.e. with each pixel of the averaged image being determined by averaging 4 pixels or 16 pixels of the captured image respectively). In some examples, the sub-grid may be non-square, e.g. may be rectangular (for example a two by one sub-grid, a two by three sub-grid, etc.).

The controller may determine, pixel-by-pixel, the value of each pixel of the averaged image. For each pixel of the averaged image, it may be determined whether the value associated with one or more of the pixels of the relevant sub-grid of the image corresponds to erroneous data, i.e. whether it has been identified as corresponding to erroneous data according to the techniques described in relation to FIG. 4. For each pixel of the averaged image, an average is taken over all pixels in the corresponding sub-grid of the image which do not correspond to erroneous data. Any pixel of the sub-grid which is associated with erroneous data, i.e. with the artefact, may be masked out of the taking of the average, i.e. its data may not be included in the taking of the average.

For example, starting at the top left corner of FIG. 6, the pixel in the top left corner of the averaged image may be determined to have a value corresponding to the average of the values associated with each of the four pixels of the sub-grid in the top left corner of the image. The pixel in the top left corner of the averaged image and the four pixels of the sub-grid in the top left corner of the image have corresponding locations. None of the pixels in the sub-grid in the top left corner of the image comprises erroneous data. Therefore, the value associated with the top left pixel of the averaged image is the average of the values of the four pixels of the sub-grid in the top left corner of the image. No erroneous data associated with the artefact is present in relation to this pixel and therefore no masking of values is required.

The averaging may proceed pixel-by-pixel, for example along each row in turn or down each column in turn. In some examples, the averaging of the different pixels may be performed in parallel by different processors in order to speed up the processing (as referred to above). The relative locations of the different pixels are preserved in the averaging. For example, the second pixel in the top row of the averaged image may be generated by taking an average of the third and fourth pixels in the top row of the averaged image and the third and fourth pixels in the second row of the averaged image. In other words, the locations of respective pixels in the image and the averaged image may be said to correspond.

An example of the taking of an average which does require masking is also depicted in FIG. 6, namely for the pixel in the second row and the second column of the averaged image. For this pixel, the corresponding sub-grid of the image is made up of the four pixels in the third and fourth rows and the third and fourth columns of the image (since the downsizing/spatial averaging is by a factor of two in each of the x and y dimensions). The values of the pixels in the third and fourth columns of the fourth row of the image are erroneous due to the artefact. Therefore, the controller masks these two values from the taking of the average. In this example, the average is therefore the average of the pixels in the third and fourth columns of the third row of the image.

As will be appreciated, for other examples with different degrees of spatial averaging, i.e. with different sizes of sub-grids over which averages are taken, different numbers of pixels of sub-grids may be excluded from the taking of averages and different numbers of remaining pixels may remain for generating each pixel of the averaged image. In some examples, a sub-grid may comprise multiple rows of pixels comprising erroneous data due to the artefact, the pixels of which may all be excluded from the taking of the average.

In some examples, for a particular pixel of an averaged image, if all pixels in corresponding locations are erroneous, the pixel of the averaged image may return null data. An alert or notification may be provided. A prompt may be provided that the averaging should be performed over a greater number of images and/or over a larger sub-grid of an image. Alternatively or in addition, the particular pixel of the averaged image may in response be generated based on one or more neighbouring pixels of the images or may be generated based on pixels in corresponding locations of more temporally distant frames.

In some examples, one or more of the steps described herein may be performed in real-time during imaging of a subject, for example during a radiotherapy treatment. For example, the detection of the erroneous pixel and the generating of the averaged image may be performed in real-time during a radiotherapy treatment. The speed and the efficiency of the described techniques may enable use of the described techniques in real-time during a radiotherapy treatment. As used herein, references to real-time use during a radiotherapy treatment may be used to refer to processing that occurs while radiotherapy treatment is ongoing, to processing that can be used to make adjustments to one or more parameters/components of the radiotherapy device or to the subject position, or to refer to processing performed substantially immediately or directly after the relevant images are captured (e.g. in a fraction of a second).

In some examples, generating the averaged image as described herein may comprise generating a pixel (or each pixel) of the averaged image which is not in a corresponding location to the erroneous pixel by taking an average of n pixels, wherein n is an integer. Generating the pixel in the averaged image which is in the corresponding location to the erroneous pixel may comprise taking an average of fewer than n pixels, e.g. n-1 pixels or n-2 pixels.

In some examples, the averaged image may be generated by taking a temporal average of a plurality of images excluding erroneous pixels as described above, following which a spatial average may be taken of the averaged image. In some examples, the averaged image may be generated by taking a spatial average of an image excluding erroneous pixels as described above. One or more further averaged images may be generated by taking respective spatial averages of each of one or more further images. The erroneous pixels may be excluded in the taking of these spatial averages as described above. Following this, a temporal average may be taken of the averaged image and the one or more further averaged images.

Therefore, masked temporal averaging may be followed by (unmasked) spatial averaging, or masked spatial averaging may be followed by (unmasked) temporal averaging. In either case, the identification of the erroneous pixels and the masked averaging may be performed before the optional unmasked averaging. This advantageously enables more accurate identification of the erroneous pixels in the raw data. While identifying the erroneous pixels would still be possible after they were averaged in an unmasked manner, the averaging would in general blend erroneous pixels with non-erroneous pixels such that the spike in the profile caused by the averaged erroneous pixel would be less prominent and may be less readily identifiable.

Moreover, the above-described order in which the processing is performed enables more optimal use of the available data points. This may be seen by considering an example involving temporally averaging raw images by a factor of four, and spatially averaging the raw images by a factor of four, such that a pixel of an averaged image is in general generated based on sixteen pixels of the original raw images. Taking an example in which one of these pixels is erroneous, the other fifteen pixels are non-erroneous. An initial unmasked averaging would yield four pixels, one of which is erroneous (albeit in a diluted manner). This erroneous pixel may be identified and excluded in the second (masked) averaging which is performed to generate a single pixel of the averaged image. Because the erroneous pixel included data from four pixels of the original masked image, the single pixel of the averaged image is only based on twelve pixels of the raw image. Conversely, initial identification of the erroneous pixel in the raw image, followed by initial masked averaging of the raw data, would yield four pixels, none of which are erroneous. The second (unmasked) averaging would generate a single pixel of the averaged image based on these four pixels. This single pixel would be based on fifteen pixels of the raw image. Relative to the alternative described above, three further non-erroneous pixels have been included, which improves the accuracy and the signal to noise ratio of the averaged image. Therefore, the described techniques enable more optimised use of raw images through selectively excluding erroneous pixels and maximising use of non-erroneous pixels.

In the field of imaging it is generally desirable to make use of as many data points as possible in order to increase the signal to noise ratio. Therefore, attempts at increasing accuracy have typically focused on increasing the number of data points through increasing the temporal and/or spatial resolution of an imaging apparatus in order to increase the number of pixels from which a processed image is derived. In general, scientists and engineers prefer to incorporate all available data in order to reduce the effects of noise and random error. However, the inventor of the current application has determined that reducing the number data points used can actually improve the accuracy of generated images. In particular, the described techniques involve excluding particular data points and averaging over a smaller number of data points in order to increase the accuracy of a generated image. Moreover, the described techniques do not involve excluding whole images or cropping whole regions out of images, but instead involve excluding particular erroneous pixels or rows thereof. As such, the described techniques make optimised use of the maximum number of pixels from the captured images (i.e. of all the pixels which are not erroneous).

Taking an average over all pixels in corresponding locations of one or more images is less advantageous since it leads to a systematic error in the averaged pixel value when there is an erroneous pixel present. Increasing the number of pixels averaged (by increasing the number of frames averaged or downsizing spatially by a greater factor) dilutes the effect of the erroneous pixel, but its effect remains present and leads to inaccurate data. Averaging to such a degree that the effect of the erroneous pixel becomes insignificant may require averaging over 30 second of data or more. This is unsuitable for situations in which the imaged subject or object is moving, which is of increasing importance in radiotherapy. If, instead, a correction factor was applied to the affected pixels, this would require additional processing to execute a calibration method to determine the correction factor. Thus, error in the correction factor would propagate. Moreover, such a correction factor would not be stable and would not work when using continuously variable dose rate (CVDR) treatment modes. The techniques described herein have the combined benefits of being faster to execute/ requiring less processing power and providing more accurate images.

As described herein, an artefact may appear in images when image lines are read out during pulsing of a radiotherapy treatment beam. Therefore, this is a particular challenge within the field of radiotherapy treatment since a corresponding artefact would not appear on other images, for example other kV/MV images. The described techniques provide a solution to this particular challenge in this radiotherapy context. Moreover, the apparatus and the resolution requirements associated with radiotherapy may be such as to enable exclusion of particular data points while achieving an adequate resolution and signal to noise ratio. While previous techniques have for many years focused on hardware solutions, these are less flexible, require specific hardware, and are not viable for new modes of treatment such as those using continuous variable dose rates.

While not limited thereto, the techniques described herein may be particularly adapted to the manifestation of the described artefact as a series of lines across a captured image, i.e. to a linear artefact. This enables summation of the pixel values along the axis of the artefact to identify all pixels in a given row as being erroneous pixels simultaneously. This may provide particularly computationally efficient processing relative to examples where erroneous pixels are scattered in a more random manner across a captured image since the detection of the artefact only need be performed along one dimension. The knowledge that a whole row of pixels are erroneous pixels may enable further increases in the speed of the techniques described herein, through faster exclusion of each of the pixels in that row from the generation of multiple respective pixels of the averaged image.

Figure 7:
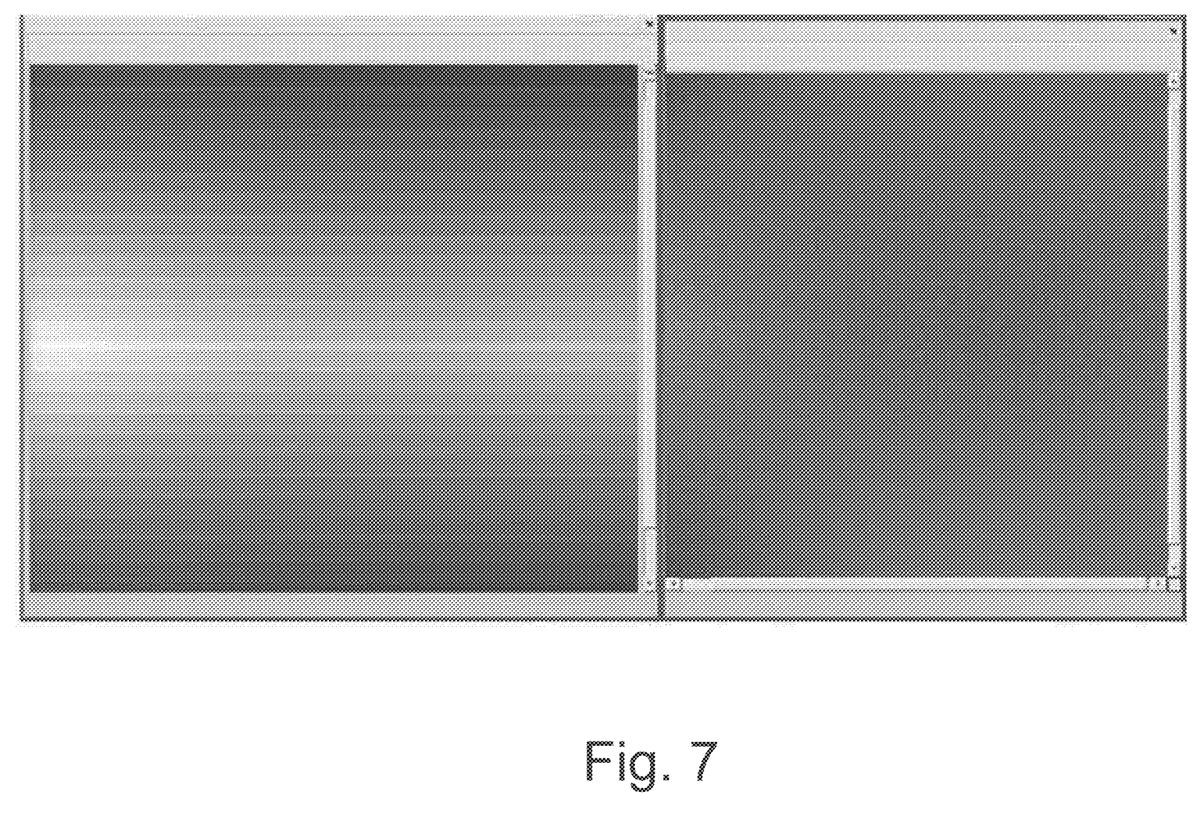
FIG. 7 depicts the effects of the techniques described herein on a kV image according to the present disclosure.

FIG. 7 depicts the effects of the techniques described herein on a kV image. Corresponding effects apply to MV images. The left side of FIG. 7 depicts a kV image generated with nothing in the field of view, i.e. with no subject 106 between the kV beam source 112 and the kV detector 114. This corresponds to the left side of FIG. 2, with the artefact visible as a series of horizontal lines which are lighter in colour than the rest of the kV image. On the right side of FIG. 7, an image is depicted which has been generated based on the techniques described herein. In particular, the image on the right side of FIG. 7 may be described as an averaged image as referred to herein. The pixel values affected by the artefact have been identified as described in FIG. 4. Spatial averaging, or temporal averaging in combination with one or more additional images, has been applied in which the erroneous pixels due to the artefact have been excluded. In the resulting image on the right side of FIG. 7, the artefact has been successfully removed. While FIG. 7 corresponds to an example with nothing in the field of view of the beam and the detector, it will be understood that, with a subject between these components, the resulting image on the right of FIG. 7 would be an image of the subject without the artefact being present.

Figure 8:
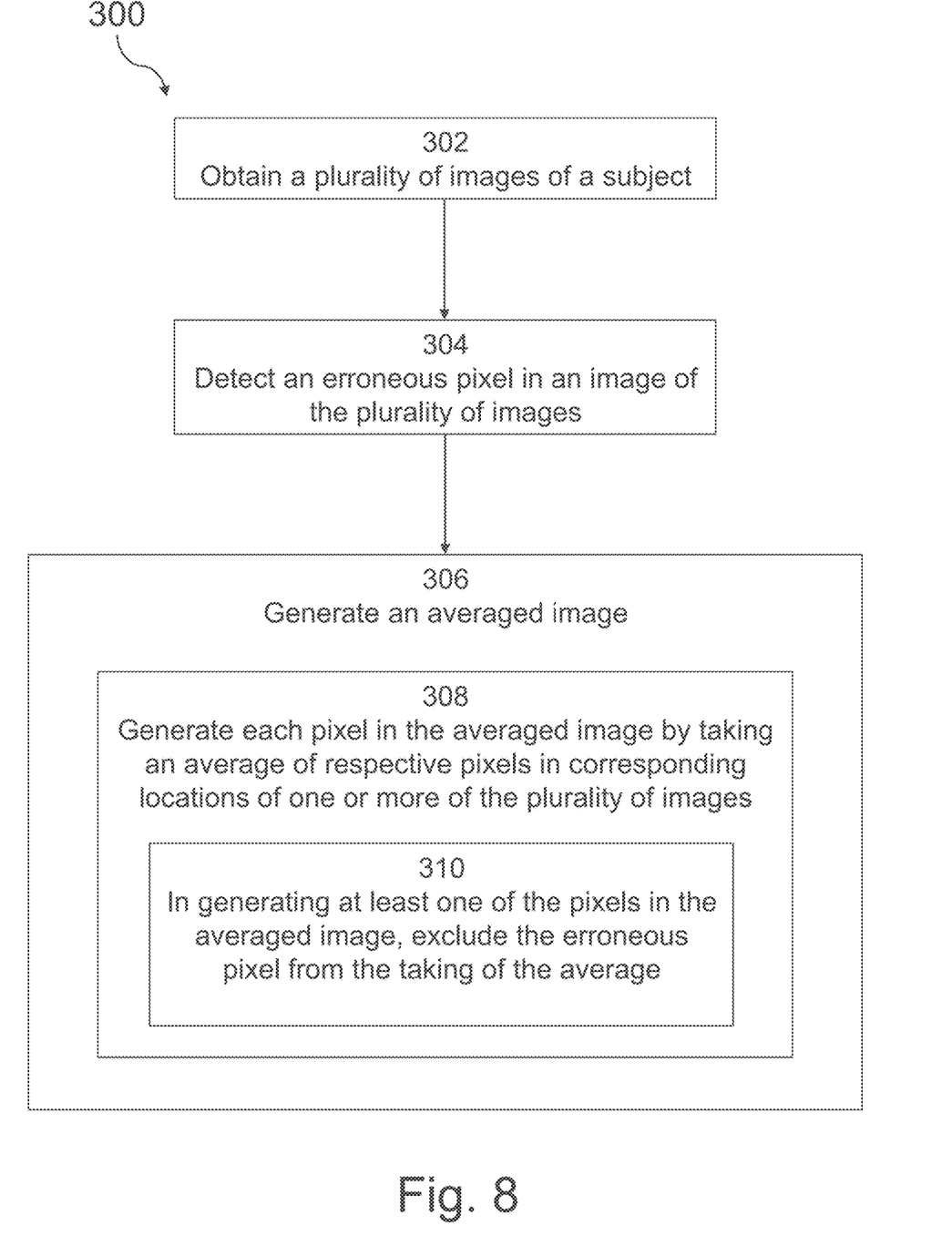
FIG. 8 depicts a method according to the present disclosure.

FIG. 8 depicts a method 300 according to the present disclosure. The method 300 may be performed by the radiotherapy device 100 or the imaging apparatus or the controller described herein.

In a step 302, a plurality of images of a subject may be obtained. The plurality of images may be generated using a kV imaging device or an MV imaging device. The plurality of images may be referred to as kV images or MV images. The plurality of images may be retrieved from a memory of the controller or from a device communicatively coupled to the controller.

In a step 304, an erroneous pixel may be detected in a pixel of an image of the plurality of images. The erroneous pixel may correspond to an artefact as described herein. Multiple pixels of one image may be detected as being erroneous and/or pixels in each of multiple (up to and including all) of the plurality of images may be detected as being erroneous. The erroneous pixel(s) may be detected by summing along the axis of the artefact, e.g. along a horizontal axis of the image(s). The artefact may be detected by identifying rows of the image for which the summed value of the pixels in that row exceed a threshold.

In a step 306, an averaged image may be generated. The step 306 may comprise a step 308 in which each pixel in the averaged image is generated by taking an average of respective pixels in corresponding locations of one or more of the plurality of images. The step 308 may comprise a step 310 of generating at least one of the pixels in the averaged image by excluding the erroneous pixel from the taking of the average. The taking of the average may comprise taking a temporal average with each pixel value of the averaged image based on the average value of respective pixels in corresponding locations of each of a plurality of images. The taking of the average may comprise taking a spatial average with each pixel value of the averaged image based on the average value of a sub-grid of pixels in a corresponding location of an image of the plurality of images.

While the methods disclosed herein are presented in a certain sequential order, this should not be taken to limit the methods to the orders presented. One or more of the method steps may be omitted or rearranged. The various steps may be performed in different orders. Various steps may be performed at the same time or substantially the same time. Herein, references to events occurring substantially at the same time may refer to events at least partially overlapping in time and/or events occurring at the same time within measurement uncertainties.

Figure 9:
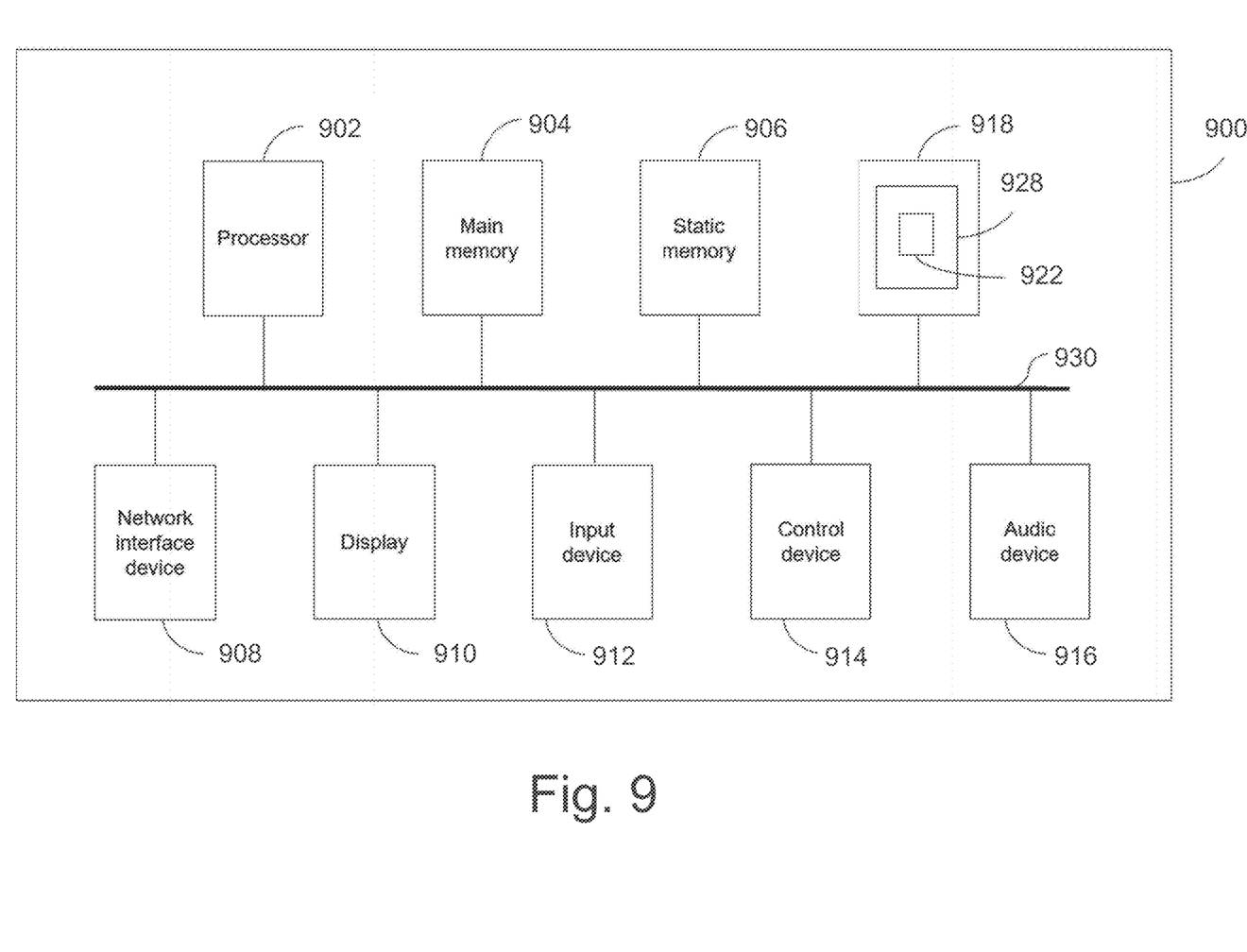
FIG. 9 depicts an example implementation of a computing device according to the present disclosure.

FIG. 9 illustrates a block diagram of one implementation of a computing device 900 within which a set of instructions, for causing the computing device to perform any one or more of the methodologies discussed herein, may be executed. In alternative implementations, the computing device may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. The computing device may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein. The computing device 900 may correspond to any one or more of the controllers or control devices described herein.

The example computing device 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a secondary memory (e.g., a data storage device 918), which communicate with each other via a bus 930.

Processing device 902 represents one or more general-purpose processors such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. Processing device 902 is configured to execute the processing logic (instructions 922) for performing the operations and steps discussed herein.

The computing device 900 may further include a network interface device 908. The computing device 900 also may include a video display unit 910 (e.g., a liquid crystal display (LCD) or a cathode ray tube (CRT)), an alphanumeric input device 912 (e.g., a keyboard or touchscreen), a cursor control device 914 (e.g., a mouse or touchscreen), and an audio device 916 (e.g., a speaker).

The data storage device 918 may include one or more machine-readable storage media (or more specifically one or more non-transitory computer-readable storage media) 928 on which is stored one or more sets of instructions 922 embodying any one or more of the methodologies or functions described herein. The instructions 922 may also reside, completely or at least partially, within the main memory 904 and/or within the processing device 902 during execution thereof by the computer system 900, the main memory 904 and the processing device 902 also constituting computer-readable storage media.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

In an implementation, the modules, components and other features described herein can be implemented as discrete components or integrated in the functionality of hardware components such as ASICS, FPGAs, DSPs or similar devices.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the following discussion, it is appreciated that throughout the description, discussions utilizing terms such as "receiving", "determining", "comparing", "enabling", "maintaining," "identifying," "applying," "transmitting," "generating," or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The approaches described herein may be embodied on a computer-readable medium, which may be a non-transitory computer-readable medium. The computer-readable medium may carry computer-readable instructions arranged for execution upon a processor so as to cause the processor to carry out any or all of the methods described herein.

The term "computer-readable medium" as used herein refers to any medium that stores data and/or instructions for causing a processor to operate in a specific manner. Such storage medium may comprise non-volatile media and/or volatile media. Non-volatile media may include, for example, optical or magnetic disks. Volatile media may include dynamic memory. Exemplary forms of storage medium include, a floppy disk, a flexible disk, a hard disk, a solid state drive, a magnetic tape, or any other magnetic data storage medium, a CD-ROM, any other optical data storage medium, any physical medium with one or more patterns of holes, a RAM, a PROM, an EPROM, a FLASH-EPROM, NVRAM, and any other memory chip or cartridge.

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described, but can be practiced with modification and alteration within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A radiotherapy device comprising:
   a radiation source, wherein the radiation source is configured to deliver kilovolt (kV) or megavolt (MV) radiation;
   a detector configured to detect the kV or MV radiation to generate a plurality of images of a subject located between the radiation source and the detector; and
   a controller configured to:
      detect an erroneous pixel in an image of the plurality of images; and
      generate an averaged image, wherein to generate an averaged image comprises:
         generating each pixel of the averaged image by taking an average of two or more respective pixels in two or more corresponding locations of one or more of the plurality of images, wherein generating a pixel of the averaged image which is in a corresponding location to the erroneous pixel comprises excluding the erroneous pixel from the taking of the average, wherein the image comprises a row of erroneous pixels including the erroneous pixel, and wherein the controller is configured to detect the row of erroneous pixels in the image of the plurality of images.

2. The radiotherapy device according to claim 1, wherein generating the averaged image comprises:
   generating a pixel of the averaged image which is not in a corresponding location to the erroneous pixel by taking an average of n pixels, n being an integer, and generating the pixel in the averaged image which is in the corresponding location to the erroneous pixel comprises taking an average of fewer than n pixels.

3. The radiotherapy device according to claim 1, wherein the averaged image is generated based on one or more pixels of the image other than the erroneous pixel.

4. The radiotherapy device according to claim 1, wherein the averaged image is generated based on one or more pixels of the image adjacent to the erroneous pixel.

5. The radiotherapy device according to claim 1, wherein the controller is configured to:
   detect the row of erroneous pixels by summing pixel values of the image along each row of the image to determine a plurality of summed pixel values; and identify the row of erroneous pixels as a row corresponding to a summed pixel value that at least one of exceeds a threshold or exceeds an average of the plurality of summed pixel values by a predetermined factor.

6. The radiotherapy device according to claim 1, wherein the controller is configured to:
exclude each erroneous pixel of the row of erroneous pixels from the generating of respective pixels of the averaged image.

7. The radiotherapy device according to claim 1, wherein the controller being configured to generate the averaged image comprises the controller being configured to:
temporally average the plurality of images to generate the averaged image, wherein each pixel in the averaged image is generated by taking an average of respective pixels in corresponding locations of multiple of the plurality of images.

8. The radiotherapy device according to claim 1, wherein the controller being configured to generate the averaged image comprises the controller being configured to:
spatially average an image of the plurality of images to generate the averaged image, wherein each pixel in the averaged image is generated by taking an average of a respective sub-grid of pixels in a corresponding location of the image.

9. The radiotherapy device according to claim 1, wherein the erroneous pixel corresponds to an artefact caused by application of a radiotherapy beam at the same time as reading out of data associated with the erroneous pixel.

10. The radiotherapy device according to claim 1, wherein the controller is configured to:
detect the erroneous pixel and generate the averaged image in real-time during a radiotherapy treatment.

11. A computer-implemented method comprising:
obtaining a plurality of images of a subject located between a source and a detector of a radiotherapy device, the source being configured to deliver kilovolt (kV) or megavolt (MV) radiation and the detector being for detecting the kV or MV radiation;
detecting an erroneous pixel in an image of the plurality of images;
generating an averaged image, comprising generating each pixel of the averaged image by taking an average of two or more respective pixels in two or more corresponding locations of one or more of the plurality of images, wherein generating a pixel of the averaged image which is in a corresponding location to the erroneous pixel comprises excluding the erroneous pixel from the taking of the average, wherein the image comprises a row of erroneous pixels including the erroneous pixel; and
detecting the row of erroneous pixels in the image of the plurality of images.

12. The computer-implemented method according to claim 11, wherein generating the averaged image comprises generating a pixel of the averaged image which is not in a corresponding location to the erroneous pixel by taking an average of n pixels, n being an integer, and generating the pixel in the averaged image which is in the corresponding location to the erroneous pixel comprises taking an average of fewer than n pixels.

13. The computer-implemented method according to claim 11, comprising:
generating the averaged image based on pixels of the image other than the erroneous pixel.

14. The computer-implemented method according to claim 11, comprising:
generating the averaged image based on one or more pixels of the image adjacent to the erroneous pixel.

15. The computer-implemented method according to claim 11, comprising:
detecting the row of erroneous pixels by summing pixel values of the image along each of its rows to determine a plurality of summed pixel values; and
identifying the row of erroneous pixels as a row corresponding to a summed pixel value that exceeds a threshold or that exceeds an average of the plurality of summed pixel values by a predetermined factor.

16. A computer-implemented method according to claim 11, comprising:
excluding each erroneous pixel of the row of erroneous pixels from the generating of respective pixels of the averaged image.

17. The computer-implemented method according to claim 11, wherein the generating of the averaged image comprises:
temporally averaging the plurality of images to generate the averaged image, wherein each pixel in the averaged image is generated by taking an average of respective pixels in corresponding locations of multiple of the plurality of images.

18. The computer-implemented method according to claim 11, wherein the generating of the averaged image comprises:
spatially averaging an image of the plurality of images to generate the averaged image, wherein each pixel in the averaged image is generated by taking an average of a respective sub-grid of pixels in a corresponding location of the image.

19. The computer-implemented method according to claim 11, wherein the erroneous pixel corresponds to an artefact caused by application of a radiotherapy beam at the same time as reading out of data associated with the erroneous pixel.

20. The computer-implemented method according to claim 11, wherein the method is performed in real-time during a radiotherapy treatment.

21. A non-transitory computer-readable medium comprising computer-executable instructions which, when executed by a processor of a computer, cause the processor to:
obtain a plurality of images of a subject located between a source and a detector of a radiotherapy device, the source being configured to deliver kilovolt (kV) or megavolt (MV) radiation and the detector being for detecting the kV or MV radiation;
detect an erroneous pixel in an image of the plurality of images; and
generate an averaged image, comprising generating each pixel of the averaged image by taking an average of two or more respective pixels in two or more corresponding locations of one or more of the plurality of images, wherein generating a pixel of the averaged image which is in a corresponding location to the erroneous pixel comprises excluding the erroneous pixel from the taking of the average, wherein the image comprises a row of erroneous pixels including the erroneous pixel, and wherein the computer-executable instructions cause the processor to detect the row of erroneous pixels in the image of the plurality of images.

* * * * *